United States Patent

[11] 3,604,262

| [72] | Inventor | Mike Craddock<br>P.O. Box 1068, Big Spring, Tex. 79720 |
|---|---|---|
| [21] | Appl. No. | 783,467 |
| [22] | Filed | Dec. 10, 1968 |
| [45] | Patented | Sept. 14, 1971 |

[54] FLOW RATE AND LOW FLOW INDICATOR
2 Claims, 1 Drawing Fig.

[52] U.S. Cl. .................................................. 73/194 R,
340/239, 23/194 E
[51] Int. Cl. ...................................................... G01f 1/04,
G08b 21/00

[50] Field of Search .......................................... 73/129,
199; 340/239

[56] References Cited
UNITED STATES PATENTS
3,284,788  11/1966  Hudson ........................ 340/239

Primary Examiner—Richard C. Queisser
Assistant Examiner—Ellis J. Koch

ABSTRACT: A flow measuring and monitoring system is provided that both measures flow and provides an indication when the flow falls below a predetermined minimum flow rate.

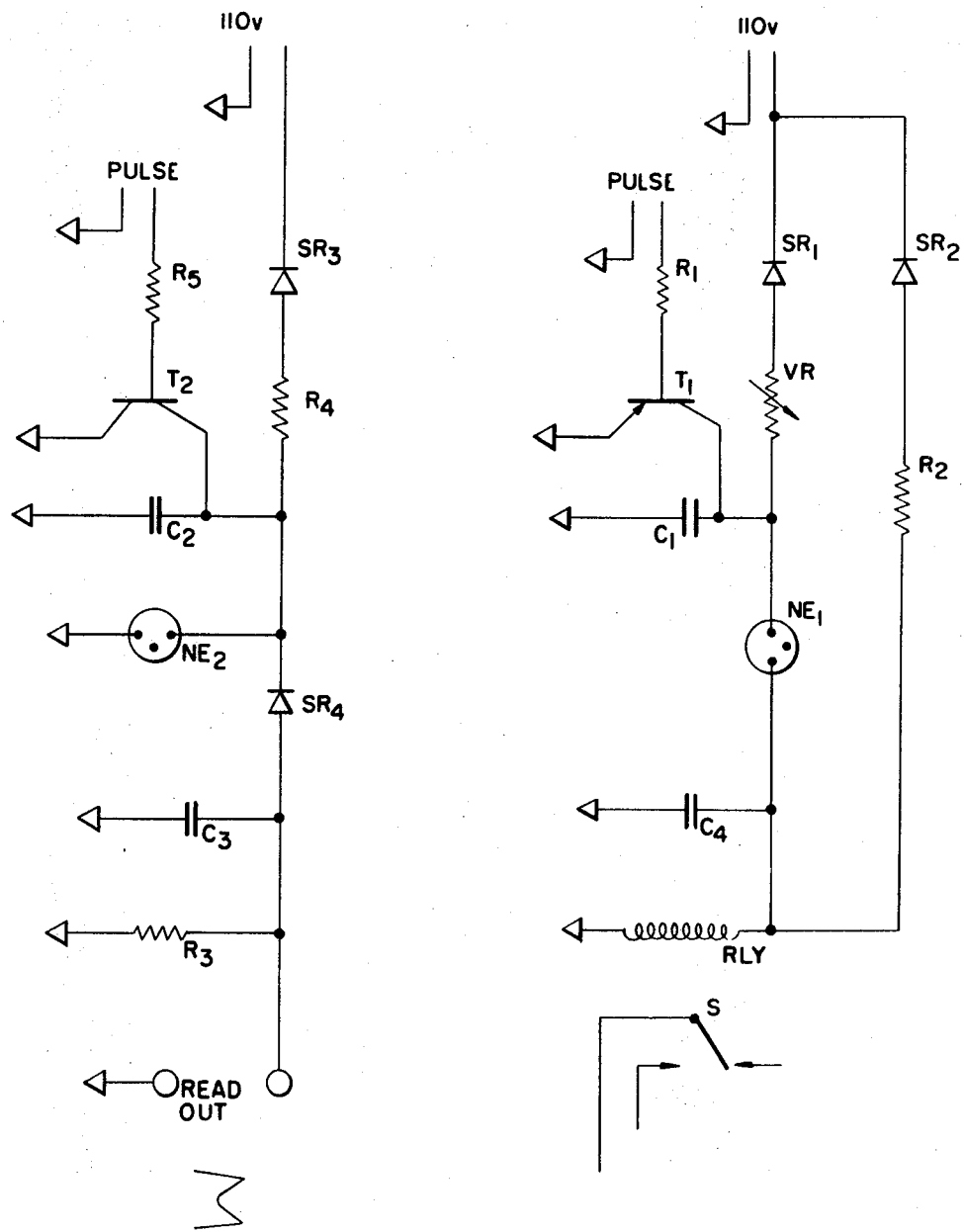
INVENTOR.
MIKE CRADDOCK

FLOW RATE AND LOW FLOW INDICATOR

This invention relates generally to data gathering in an oil field secondary recovery system, and more particularly relates to a circuit to monitor electrical pulses from flow meters in order to convert the pulses into a constant level electrical signal proportional to the frequency of the pulses and therefore proportional to the flow rate. Also this circuit provides for selection of a minimum number of pulses at which point an indicator or contact operator would alarm or control as a low flow rate indication.

Many control systems presently being used employ flow measuring devices at water injection sites which operate a set of contacts as each barrel of water passes. These contacts are in series with voltage and remote pulse counters which record the total number of barrels having been injected in the injection site.

Pulses from a large number of such sites are cabled to a common point for display on the pulse recording devices.

In accordance with my invention, the pulses are picked up parallel with the pulse counters, and the pulsing signal is fed through a current limiting resistance on the base of a first transistor, the collector and emitter of which are connected parallel to a capacitor. As each pulse occurs, the transistor conducts to discharge the capacitor. The capacitor is constantly being charged through a diode and variable resistor connected to a 110 v. AC source. Consequently, the frequency of the pulses determine the maximum voltage to which the capacitor may be charged. A series connection of a gas diode and a relay coil is connected parallel with the capacitor. If the pulses do not arrive on schedule, the capacitor will be over charged to the point that the gas diode will ignite, discharging the capacitor through the coil of the relay, causing it to pull in. The relay is held in by an electrical latch circuit, so that an indication of low flow rate is derived from its contacts. The resistance of the variable resistor determine the charging rate of the capacitor, hence the frequency of pulses below which the gas diode will conduct the indicate low flow. The relay may be replaced with a transistor.

Continuous flow rate indication is obtained by a second current limiting resistor connecting a second transistor base to the source of pulses, the second transistor being connected parallel to a second capacitor. The second capacitor is continuously being charged through a fixed resistor, consequently, the maximum voltage rise across the capacitor is directly proportional to the time between pulses. The voltage across this capacitor is transferred through a directional diode to a third capacitor which always holds the maximum charge available for read out through a high resistance volt meter. A high resistance bleed off resistor is connected parallel to the capacitor so that the read out voltage will be responsive to a reduced maximum voltage on an increase in pulse rate.

The novel features believed characteristic of this invention are set forth in the appended claims. The invention itself, however, as well as other objects and advantages thereof, may best be understood by reference to the following detailed description of the illustrative drawing.

Referring to the drawing, electron flow occurs on the negative half-cycle from the 110 input through $SR_2$, $R_2$ and Rly. $C_4$, connected parallel with Rly filters the DC pulses rectified by $SR_2$, $R_2$ creates a voltage drop so that the voltage across Rly is above pull in, but below fall out value. This series circuit serves as an electrical latching system for Rly.

Electron flow also occurs on the negative half cycle through SR, and a variable resistance VR, to charge $C_1$, on a long RC time constant. When sufficient voltage builds up across $C_1$, the gas diode $NE_1$, ionizes, discharging $C_1$ through the $NE_1$, and Rly. When this occurs, Rly will pull in and hold in due to the series circuit $SR_2$, $R_2$, and Rly. The contacts of Rly, S, are available to operate an indicator or control function. Rly can be replaced by a transistor by substituting an indicator for $R_2$ and using a voltage divider from $NE_1$, to the transistor base.

Capacitor $C_1$ has a transistor connected parallel which will discharge it if a pulse occurs through $R_1$ on to the base of the transistor $T_1$. In circuit operation, a pulse occurs regularly with each increment of fluid measurement which discharges $C_1$ before it charges sufficiently to ionize $NE_1$. The variable resistance, VR, is adjustable so that a minimum frequency of pulses may be selected. If the pulse frequency falls below the selected value, $C_1$ will over charge, ionizing $NE_1$, latching Rly to indicate low flow.

Electron flow also occurs on the negative half-cycle through $SR_3$ and $R_4$ to charge $C_2$. $C_2$ is periodically discharged through the transistor, $T_2$, as a pulse occurs through $R_5$ on to the base of $T_2$. Since $R_4$ is of a fixed value, the maximum charge built up on $C_2$ is analogous to the pulse rate, hence the flow rate. The maximum voltage built up on $C_2$ is transferred through a directional diode, $SR_4$, to charge $C_3$ to an equal value. The charge across $C_3$ is maintained when $C_2$ discharged due to $SR_4$. The charge on $C_3$ is made available for measurement by a high resistance voltmeter calibrated to indicate flow rate. A bleed off resistor, $R_3$ is connected parallel with $C_3$ so that $C_3$ will equalize to the maximum voltage impressed on $C_2$. The gas diode $NE_2$ protects $T_2$ from over voltage by discharging $C_2$ at maximum design voltage in the event that pulses cease to occur to discharge $C_2$.

Although a preferred embodiment of the invention has been described in detail, it is to be understood that various changes, substitutions and alternations can be made therein without departing from the spirit and scope of the invention as defined by the appended claims.

What I claim is:

1. In a system for indicating flow rate and signalling flow below a predetermined minimum, the combination of:

A means for generating electrical pulses at a frequency proportional to flow rate, A first circuit means for indicating flow rate, A second circuit means for signaling flow rate below a predetermined minimum, A said second circuit including a first transistor connected at its base to said pulse generating means to receive said pulses and a capacitor connected across the collector and emitter of said first transistor, an AC source, a first diode and a variable resistor connected in series to said AC source for providing a variable DC current from said AC source and a gas diode and a relay connected to series with said variable resistor, said capacitor being further connected to said series between said variable resistor and said gas diode whereby under normal flow said capacitor is charged by said DC current and periodically discharged when said first transistor receives a pulse from said pulse source thereby becoming conductive but under flow less than said predetermined minimum when said pulses are less frequent, said capacitor will over charge thereby ionizing said gas diode, permitting said relay to switch, And a signalling means actuated upon said switching of said relay to give a signal of flow less than said predetermined minimum.

2. The combination of claim 1 wherein said first circuit means includes a second transistor connected at its base to said means for generating pulses to receive said pulse and a first capacitor connected across the collector and emitter of said second transistor, an AC source, a second diode and a resistor connected in series to said AC source for providing a pulsing DC current from said AC source and a second diode and further capacitor connected in series with said resistor, said first capacitor being further connected to said series between said resistor and said second diode, a gas diode in parallel with said first capacitor to prevent said first capacitor from overcharging by discharging said first capacitor in the event a maximum design voltage is reached and a bleed resistance in parallel with said further capacitor, whereby said first capacitor will be charged by said DC current and periodically discharged when said second transistor receives a pulse from said pulse source thereby become conductive and whereby said further capacitor is charged to and maintains the maximum charge of said first capacitor and a read out means for reading out the charge on said further capacitor.